United States Patent [19]

Katta et al.

[11] Patent Number: 5,515,437
[45] Date of Patent: May 7, 1996

[54] SCRAMBLE TRANSMISSION APPARATUS AND SIGNAL PROCESSING APPARATUS

[75] Inventors: Noboru Katta, Itami; Hiroki Murakami, Osaka; Susumu Ibaraki; Seiji Nakamura, both of Toyonaka, all of Japan

[73] Assignee: Matsushita Electric Industrial Co., Ltd., Osaka, Japan

[21] Appl. No.: 291,420

[22] Filed: Aug. 16, 1994

[30] Foreign Application Priority Data

Aug. 23, 1993 [JP] Japan .................................. 5-207625
Nov. 9, 1993 [JP] Japan .................................. 5-279530

[51] Int. Cl.[6] ................................................. H04N 7/167
[52] U.S. Cl. .............................. 380/20; 348/403; 380/10; 380/14
[58] Field of Search .............................. 380/20, 10, 14; 348/403

[56] References Cited

U.S. PATENT DOCUMENTS

| | | |
|---|---|---|
| 4,771,458 | 9/1988 | Citta et al. . |
| 5,208,857 | 5/1993 | Lebrat .................................. 380/14 |
| 5,216,712 | 6/1993 | Shimoda et al. ....................... 380/4 |
| 5,384,849 | 1/1995 | Jeong ...................................... 380/49 |

FOREIGN PATENT DOCUMENTS 582122 2/1994 European Pat. Off. .

OTHER PUBLICATIONS

"A Scrambling System for Communication Satellite Television", Toshikazu Nezu, et al. ITEJ Technical Report, vol. 15 No. 14, pp. 1–6, Feb. 1991.
"Information Technology—Generic Coding of Moving Pictures and Associated Audio", ISO-IEC 13818-2 Committee Draft, Nov. 5, 1993.
"Information Technology—Coding of Moving Pictures and Associated Audio for Digital Storage Media at up to about 1,5 Mbit/s", ISO/IEC 11172-2, 1993.

Primary Examiner—Stephen C. Buczinski
Attorney, Agent, or Firm—Wenderoth, Lind & Ponack

[57] ABSTRACT

The occurrence of malfunction on the reproduction side is avoided by preventing a scrambled signal from being coincided with a reserved word in the signal when a scramble process is carried out in order to release a transmission signal to specific users. The scramble process includes at least one of methods of (1) bit-inverting specified codes of the transmission signal code by code, (2) limiting bits to be scrambled from a specified position in the transmission signal, and (3) limiting codes to be scrambled to specific codes.

46 Claims, 13 Drawing Sheets

FIG. 3
*PRIOR ART*

| NAME | START CODE VALUE (HEXADECIMAL) |
|---|---|
| PICTURE_START_CODE | 00 |
| SLICE_START_CODE | 01 THROUGH AF |
| RESERVED | B0 |
| RESERVED | B1 |
| USER_DATA_START_CODE | B2 |
| SEQUENCE_HEADER_CODE | B3 |
| SEQUENCE_ERROR_CODE | B4 |
| EXTENSION_START_CODE | B5 |
| RESERVED | B6 |
| SEQUENCE_END_CODE | B7 |
| GROUP_START_CODE | B8 |
| SYSTEM START CODES (SEE NOTE) | B9 THROUGH FF |

FIG. 5
*PRIOR ART*

| CODE | CODE | CODE | CODE | CODE |
|---|---|---|---|---|
| XXX0 - 0 | 0 —— 0 | 0 ——— 0 | 0 — 0 | 0 - 0XXX |

THE NUMBER OF CONSECUTIVE BITS 0

FIG. 6
*PRIOR ART*

```
macroblock() {
                                                Bit length
    while(nextbits() = '0000 0001 111')
        macroblock_stuffing                     11
    while(nextbits() = '0000 0001 000')
        macroblock_escape                       11
    macroblock_address_increment                1-11    Variable-length code
    macroblock_type                             1-6     Variable-length code
    if(macroblock_quant)
        quantizer_scale                         5       Fixed-length code
    if(macroblock_motion_forward) {
        motion_horizontal_forward_code          1-11    Variable-length code
        if((forward_fl=1) &&
            (motion_horizontal_forward_code1 = 0))
                motion_horizontal_forward_r     1-6     Variable-length code
        motion_vertical_forward_code            1-11    Variable-length code
        if((forward_fl=1) &&
            (motion_vertical_forward_code1=0))
                motion_vertical_forward_r       1-6     Variable-length code
    }
    if(macroblock_motion_backward) {
        motion_horizontal_backward_code         1-11    Variable-length code
        if((backward_fl=1) &&
            (motion_horizontal_backward_code1 = 0))
                motion_horizontal_backward_r    1-6     Variable-length code
        motion_vertical_backward_code           1-11    Variable-length code
        if((backward_fl=1) &&
            (motion_vertical_backward_code1=0))
                motion_vertical_backward_r      1-6     Variable-length code
    }
    if(macroblock_pattern)
        coded_block_pattern                     3-9     Variable-length code
    for(i=0;i<6;i++)
        block(i)
    if(picture_coding_type==4)
        end_of_macroblock                       1
}
```

FIG. 7
PRIOR ART

| macroblock_address-increment VLC code | increment value | macroblock_address-increment VLC code | increment value |
|---|---|---|---|
| 1 | 1 | 0000 0101 10 | 17 |
| 011 | 2 | 0000 0101 01 | 18 |
| 010 | 3 | 0000 0101 00 | 19 |
| 0011 | 4 | 0000 0100 11 | 20 |
| 0010 | 5 | 0000 0100 10 | 21 |
| 0001 1 | 6 | 0000 0100 011 | 22 |
| 0001 0 | 7 | 0000 0100 010 | 23 |
| 0000 111 | 8 | 0000 0100 001 | 24 |
| 0000 110 | 9 | 0000 0100 000 | 25 |
| 0000 1011 | 10 | 0000 0011 111 | 26 |
| 0000 1010 | 11 | 0000 0011 110 | 27 |
| 0000 1001 | 12 | 0000 0011 101 | 28 |
| 0000 1000 | 13 | 0000 0011 100 | 29 |
| 0000 0111 | 14 | 0000 0011 011 | 30 |
| 0000 0110 | 15 | 0000 0011 010 | 31 |
| 0000 0101 11 | 16 | 0000 0011 001 | 32 |
| | | 0000 0011 000 | 33 |
| | | 0000 0001 111 | macroblock_stuffing |
| | | 0000 0001 000 | macroblock_escape |

< macroblock_address_increment >

FIG. 8
*PRIOR ART*

I - PICTURE

| VLC code | macroblock_quant | macroblock_motion_forward | macroblock_motion_backward | macroblock_pattern | macroblock_intra |
|---|---|---|---|---|---|
| 1   | 0 | 0 | 0 | 0 | 1 |
| 01  | 1 | 0 | 0 | 0 | 1 |

P - PICTURE

| VLC code | macroblock_quant | macroblock_motion_forward | macroblock_motion_backward | macroblock_pattern | macroblock_intra |
|---|---|---|---|---|---|
| 1      | 0 | 1 | 0 | 1 | 0 |
| 01     | 0 | 0 | 0 | 1 | 0 |
| 001    | 0 | 1 | 0 | 0 | 0 |
| 00011  | 0 | 0 | 0 | 0 | 1 |
| 00010  | 1 | 1 | 0 | 1 | 0 |
| 00001  | 1 | 0 | 0 | 1 | 0 |
| 000001 | 1 | 0 | 0 | 0 | 1 |

B - PICTURE

| VLC code | macroblock_quant | macroblock_motion_forward | macroblock_motion_backward | macroblock_pattern | macroblock_intra |
|---|---|---|---|---|---|
| 10     | 0 | 1 | 1 | 0 | 0 |
| 11     | 0 | 1 | 1 | 1 | 0 |
| 010    | 0 | 0 | 1 | 0 | 0 |
| 011    | 0 | 0 | 1 | 1 | 0 |
| 0010   | 0 | 1 | 0 | 0 | 0 |
| 0011   | 0 | 1 | 0 | 1 | 0 |
| 00011  | 0 | 0 | 0 | 0 | 1 |
| 00010  | 1 | 1 | 1 | 1 | 0 |
| 000011 | 1 | 1 | 0 | 1 | 0 |
| 00010  | 1 | 0 | 1 | 1 | 0 |
| 000001 | 1 | 0 | 0 | 0 | 1 |

D - PICTURE

| VLC code | macroblock_quant | macroblock_motion_forward | macroblock_motion_backward | macroblock_pattern | macroblock_intra |
|---|---|---|---|---|---|
| 1 | 0 | 0 | 0 | 0 | 1 |

FIG. 9
PRIOR ART

```
block(i) {
    if(pattern_code[i]) {
        if(macroblock_intra) {                       Bit length
            if(i<4) {
                dct_dc_size_luminance                2-7   Variable-length code
                if(dct_dc_size_luminance1=0)
                    dct_dc_differential              1-8   Variable-length code
            }
            else {
                dct_dc_size_chrominance              2-8   Variable-length code
                if(dct_dc_size_chrominance1=0)
                    dct_dc_differential              1-8   Variable-length code
            }
        }
        else {
            dct_coeff_first                          2-28  Variable-length code
        }
        if(picture_coding_type1=4) {
            while(nextbits01='10')
                dct_coeff_next                       3-28  Variable-length code
            end_of_block                             2     '10'
        }
    }
}
```

FIG. 10
PRIOR ART

| dct_dc_size_luminance ||
|---|---|
| VLCcode | dct_dc_size_luminance |
| 100 | 0 |
| 00 | 1 |
| 01 | 2 |
| 101 | 3 |
| 110 | 4 |
| 1110 | 5 |
| 11110 | 6 |
| 111110 | 7 |
| 1111110 | 8 |

FIG. 11(a)

I - PICTURE CASE

| q-scale | "0" | macroblock_address_increment | macroblock_type | dct_dc_size_luminance | dct_dc_differential | dct_coeff_next |
|---|---|---|---|---|---|---|
| | | "1"↓ | "1"↓ | | | |
| "10000" | "0" | "0" | "0" | "00" | "0" | 0000 0000 00011 0111 |
| 4 bits | 1 bit | 1 bit | 1 bit | 2 bits | 1 bit | 11 bits |

⟵————————————— 21 bits —————————————⟶

FIG. 11(b)

P - PICTURE CASE

| q-scale | "0" | macroblock_address_increment | macroblock_type | motion_horizontal_forward_code | |
|---|---|---|---|---|---|
| | | "1"↓ | "1"↓ | | |
| "10000" | "0" | "0" | "0" | 0000 0011 000 | |
| 4 bits | 1 bit | 1 bit | 1 bit | 6 bits | |

⟵————————————— 13 bits —————————————⟶

FIG. 11(c)

B - PICTURE CASE

| q-scale | "0" | macroblock_address_increment | macroblock_type | motion_horizontal_forward_code | |
|---|---|---|---|---|---|
| | | "1"↓ | "11"↓ | | |
| "10000" | "0" | "0" | "00" | 0000 0011 000 | |
| 4 bits | 1 bit | 1 bit | 2 bits | 6 bits | |

⟵————————————— 14 bits —————————————⟶

FIG. 12
PRIOR ART

| MOTION VLC CODE | CODE |
|---|---|
| 0000 0011 001 | -16 |
| 0000 0011 011 | -15 |
| 0000 0011 101 | -14 |
| 0000 0011 111 | -13 |
| 0000 0100 001 | -12 |
| 0000 0100 011 | -11 |
| 0000 0100 11 | -10 |
| 0000 0101 01 | -9 |
| 0000 0101 11 | -8 |
| 0000 0111 | -7 |
| 0000 1001 | -6 |
| 0000 1011 | -5 |
| 0000 111 | -4 |
| 0001 1 | -3 |
| 0011 | -2 |
| 011 | -1 |
| 1 | 0 |
| 010 | 1 |
| 0010 | 2 |
| 0001 0 | 3 |
| 0000 110 | 4 |
| 0000 1010 | 5 |
| 0000 1000 | 6 |
| 0000 0110 | 7 |
| 0000 0101 10 | 8 |
| 0000 0101 00 | 9 |
| 0000 0100 10 | 10 |
| 0000 0100 010 | 11 |
| 0000 0100 000 | 12 |
| 0000 0011 110 | 13 |
| 0000 0011 100 | 14 |
| 0000 0011 010 | 15 |
| 0000 0011 000 | 16 |

FIG. 14
PRIOR ART

| coded_block_pattern VLC code | cbp | coded_block_pattern VLC code | cbp |
|---|---|---|---|
| 111 | 60 | 0001 1100 | 35 |
| 1101 | 4 | 0001 1011 | 13 |
| 1100 | 8 | 0001 1010 | 49 |
| 1011 | 16 | 0001 1001 | 21 |
| 1010 | 32 | 0001 1000 | 41 |
| 1001 1 | 12 | 0001 0111 | 14 |
| 1001 0 | 48 | 0001 0110 | 50 |
| 1000 1 | 20 | 0001 0101 | 22 |
| 1000 0 | 40 | 0001 0100 | 42 |
| 0111 1 | 28 | 0001 0011 | 15 |
| 0111 0 | 44 | 0001 0010 | 51 |
| 0110 1 | 52 | 0001 0001 | 23 |
| 0110 0 | 56 | 0001 0000 | 43 |
| 0101 1 | 1 | 0000 1111 | 25 |
| 0101 0 | 61 | 0000 1110 | 37 |
| 0100 1 | 2 | 0000 1101 | 26 |
| 0100 0 | 62 | 0000 1100 | 38 |
| 0011 11 | 24 | 0000 1011 | 29 |
| 0011 10 | 36 | 0000 1010 | 45 |
| 0011 01 | 3 | 0000 1001 | 53 |
| 0011 00 | 63 | 0000 1000 | 57 |
| 0010 111 | 5 | 0000 0111 | 30 |
| 0010 110 | 9 | 0000 0110 | 46 |
| 0010 101 | 17 | 0000 0101 | 54 |
| 0010 100 | 33 | 0000 0100 | 58 |
| 0010 011 | 6 | 0000 0011 1 | 31 |
| 0010 010 | 10 | 0000 0011 0 | 47 |
| 0010 001 | 18 | 0000 0010 1 | 55 |
| 0010 000 | 34 | 0000 0010 0 | 59 |
| 0001 1111 | 7 | 0000 0001 1 | 27 |
| 0001 1110 | 11 | 0000 0001 0 | 39 |
| 0001 1101 | 19 | | |

SCRAMBLE TRANSMISSION APPARATUS AND SIGNAL PROCESSING APPARATUS

BACKGROUND OF THE INVENTION

1. Field of the Invention

This invention relates to a signal processing apparatus for performing a scramble process in transmission or storage of digital coded signals and a descramble process in reproduction of the coded signals in such a manner that permits only authorized users who are given with a decoding procedure to reproduce the coded signals.

2. Description of the Prior Art

Scramble systems have been employed for pay TV broadcasts and the like. A scramble system for digital signals was introduced in a technical report by Nezu and other researchers titled as "A scramble system-M-for communication satellite television" ITEJ Technical Report Vol. 15, No. 14, pp. 1 to 6, in which descriptions are made on the scramble of sound signals. With the conventional scramble system, a signal processing apparatus comprises an exclusive OR circuit for adding a random number to an input signal, a random number generator for generating the random number in response to a scramble key, and a controller disposed between the exclusive OR circuit and the random number generator to control the random number value to be added to the input signal. The input signal is bit-inverted by logical exclusive addition to a pseudo random number from a pseudo random number generator in the exclusive OR circuit thereby to become a random-numbered, or scrambled, signal. In this case, the controller controls the bit inversion rate within the input signal by changing whether or not the random number is added to the input signal at an appropriate rate. The decoding thereof may be made by logical exclusive addition of a random number from the random number generator to the scrambled signal again. The pseudo random number generated by the random number generator is determined in response to the scramble key, and only a decoder having the scramble key can achieve decoding. With the signal processing apparatus for performing scramble and descramble as conventionally, under the condition that the synchronization on both the scramble side and descramble side can be made comparatively easy, that is, under the condition that the scrambled position within the data on the descramble side can be detected easily independently of the bit pattern of data, even if data to be scrambled are made of random numbers, the synchronization can be easily taken on the descramble side, thus being capable of reproducing the data correctly.

With the conventional structure, however, in such a communication system that data are received on the reception side from the midway of a consecutive data sequence and the synchronization of reproduction is effected by using a reserved word having a specifically reserved bit pattern, there would occur a case that a bit pattern coincided with the reserved word be generated within the scrambled data. In the case of descrambling such scrambled signal, the bit pattern coincided with the reserved word within the scrambled signal causes an incorrect synchronization, resulting in malfunction of the circuit on the reproduction side and arising such a problem that reproduction cannot be achieved correctly.

SUMMARY OF THE INVENTION

An object of this invention is to provide a signal processing apparatus for performing a scramble process not generating a bit pattern coincided with a reserved word within scrambled data nor causing malfunction on the reproduction side to occur, and a descramble process.

The signal processing apparatus of this invention comprises a scramble processing apparatus and a descramble processing apparatus, in which transmission data have a certain specific bit pattern as a reserved word reserved as a code having a particularly specified meaning and data rules specified so as not to generate the specific bit pattern except for the particularly specified meaning.

In a first aspect of this invention, a scramble processing apparatus comprises a code detector for detecting a code existing at a predetermined position in data ruled between transmission and reception sides, and a bit inverter for bit-inverting the code detected by the code detector, and a descramble processing apparatus comprises a code detector for detecting a code existing at the prespecified position, and a bit inverter for bit-inverting the code detected by the code detector. The predetermined position may be selected so that the code at the predetermined position does not generate a bit pattern coincided with the reserved word within the transmission data even if it is subjected to the bit inversion. Further, the predetermined position may be selected such that the code existing at the position contains information which is indispensable for reproducing or decoding the transmission data.

With the structure as shown above, the scramble process is limited to the bit inversion of specific codes. In the data stream in which the reserved word is specified for effecting synchronization, each code has prespecified limitations on the bit pattern of itself and the bit pattern of an adjacent code thereto in order that any of the bit pattern of itself and the bit pattern of the adjacent code thereto does not coincide with the reserved word. With the structure as shown above, out of the codes in the data stream, only such codes that do not generates the bit pattern coincided with the reserved word even if bit-inverted are to be scrambled. As a result, even if scrambled, any other false reserved words than the formal reserved word will not appear in the transmission signal. Accordingly, it does not occur that synchronization in reproduction is taken at an incorrect position on the reception side. That is, a scramble transmission apparatus capable of preventing the occurrence of malfunction on the reproduction side can be provided.

In addition, in case that the transmission data include variable-length codes and the position or break of each code of subsequent data cannot be identified so far as the reproduction is made properly in the order from the position where the synchronization of reproduction was taken, that is, in the case of video data and so on in accordance with the ISO/IEC international standards for coding moving picture (popularly called MPEG standards), only several codes may be bit-inverted to make all subsequent data to be unreproducible, so that a larger quantity of data compared with the data quantity to be scrambled can be made unreproducible.

In a second aspect of this invention, the scramble processing apparatus comprises a code detector for a detecting a prespecified position within data ruled between transmission and reception sides, and a scrambler for scrambling data within predetermined plural bits at the detected position and not coincided with the reserved word when scrambled, and a descramble processing apparatus comprises a code detector for detecting the prespecified position within the transmitted data, and a descrambler for descrambling the scrambled data at the detected position. The prespecified position may be predetermined such that the code existing at the position contains information indispensable for reproducing or decoding the transmission data.

With the structure as shown above, a scramble transmission apparatus having higher encryption level can be provided due to the fact that by limiting bits to be scrambled, there does not exist any data coincided with the reserved word other than those formally appeared in the transmission signal, and such a malfunction that detects an incorrect reserved word on the reproduction side can be prevented as well as there is no limitation upon the scramble processing method for the bits to be scrambled. In addition, in case that the transmission data include variable-length codes and the position or break of each code of subsequent data cannot be identified so far as the reproduction is made properly in the order from the position where the synchronization of reproduction is taken, for example, in the case of video data and so on in accordance with MPEG standards, only several bits may be scrambled to allow subsequent data to be unreproducible. Accordingly, compared with the scramble processing speed, data having wider transmission band can be made unreproducible.

In a third aspect of this invention, a scramble processing apparatus comprises a code detector for detecting a prespecified code within data ruled between transmission and reception side, and a converter for converting the detected code into a different bit pattern. The prespecified code ruled between transmission and reception sides may be a code not generating a bit pattern coincided with the reserved word within the data even if bit conversion is applied. A descramble processing apparatus comprises a code detector for detecting a prespecified code within the transmitted data, and a converter for descrambling a scrambled data at a detected position. The prespecified code may be any code if it contains indispensable information for reproducing or decoding the transmission data. In the case of video signals in accordance with the MPEG standards, the code to be scrambled may be at least one of picture_coding_type, temporal_reference and extension_start_code_indentifier.

With the structure as shown above, no existence of data coincided with the reserved word except for formally appeared ones in the scrambled signal results and malfunction due to detection of an incorrect reserved word on the reproduction side can be prevented from occurring.

In addition, the picture_coding_type of video signals in accordance with the MPEG standards is a code showing that such picture is being coded in any type, so that by scrambling the code, the reproduction method of the data can be mistaken, and the descramble process can generate scrambled signals completely unable to be reproduced by receivers who are not permitted to reproduce the data. Further in addition, if the temporal_reference code is to be scrambled, in case that it is intended to be reproduced without performing the descramble process, the verification of the picture position being decoded at present from GOP becomes impossible, so that scrambled signals difficult to be reproduced can be generated. Also, if the extension_start_code_identifier code is converted into any random value, in the case that it is intended to be reproduced without performing the descramble process, subsequent data will be interpreted as of a completely different extension code and the reproduction method of the subsequent data will be mistaken, thus generating scrambled signals completely impossible to be reproduced.

BRIEF DESCRIPTION OF THE DRAWINGS

FIG. 3 is a diagram for explaining a start_code of video data of the MPEG standards.

FIG. 5 is an explanatory diagram of a pattern that bit 0 is consecutively appeared in a consecutive code sequence.

FIG. 6 is an explanatory diagram of rules of code sequences of macroblocks according to the MPEG standards.

FIG. 7 is a code book of a macroblock_address_increment.

FIG. 8 is a code book of a macroblock_type.

FIG. 9 is an explanatory diagram of rules of code sequences of blocks according to the MPEG standards.

FIG. 10 is a code book of a dct_dc_size_luminance.

FIGS. 11(a), (b) and (c) are explanatory diagrams of cases that zero (0) is appeared consecutively in scrambled signals generated through the scramble processing apparatus according to the first embodiment.

FIG. 12 is a block diagram of a random number generator and an exclusive OR circuit according to a second embodiment of this invention.

FIG. 14 is a code book of a coded_block_pattern.

DESCRIPTION OF THE PREFERRED EMBODIMENTS

Figure 1A:
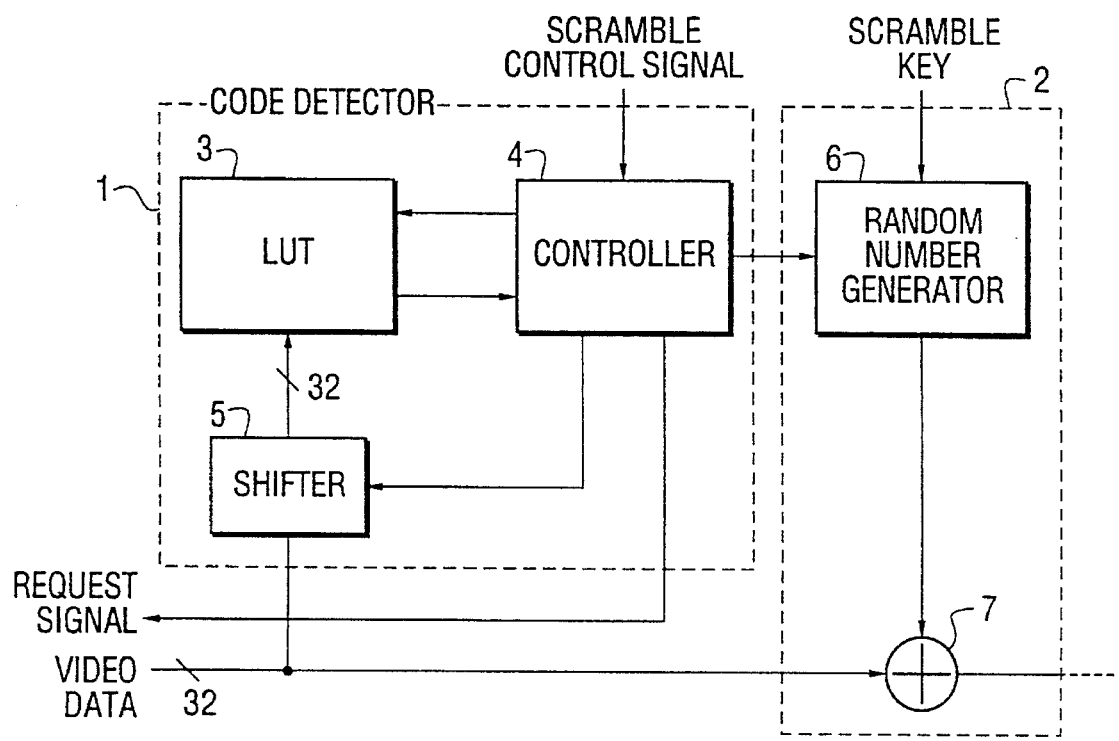
FIG. 1 is a block diagram a scramble transmission apparatus and a signal processing apparatus for performing a scramble process and a signal processing apparatus for performing a descramble process according to a first embodiment of this invention.
Figure 1B:
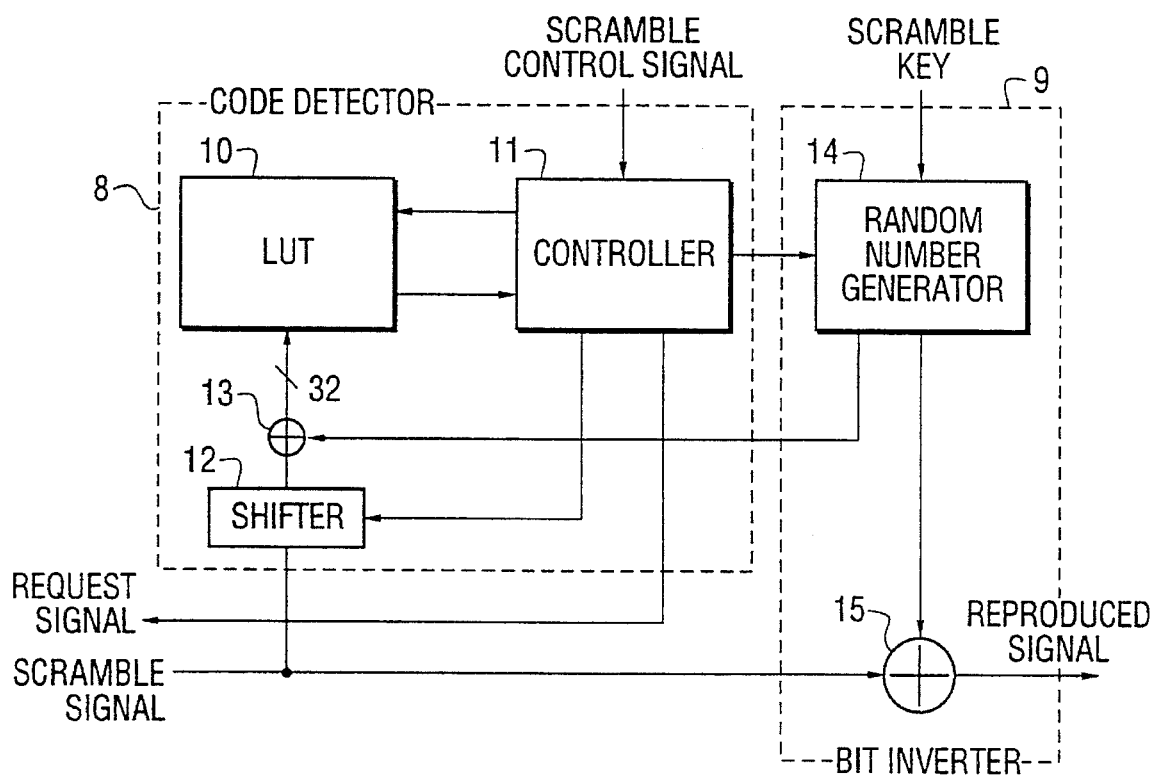

FIG. 1 is a functional block diagram of a scramble apparatus and a descramble apparatus according to a first embodiment of this invention.

The operation of the scramble apparatus of the first embodiment will be described below while referring to FIG. 1.

First, an input signal is supposed to be a video signal in accordance with the MPEG (Moving Picture Coding Expert Group) standards. The MPEG standards include, for example, ISO/IEC CD 13818 (generally named MPEG-2) which is a committee draft of ISO/IEC and ISO/IEC IS 11172 (generally named MPEG-1) which is an international standard of ISO/IEC.

Figure 2:
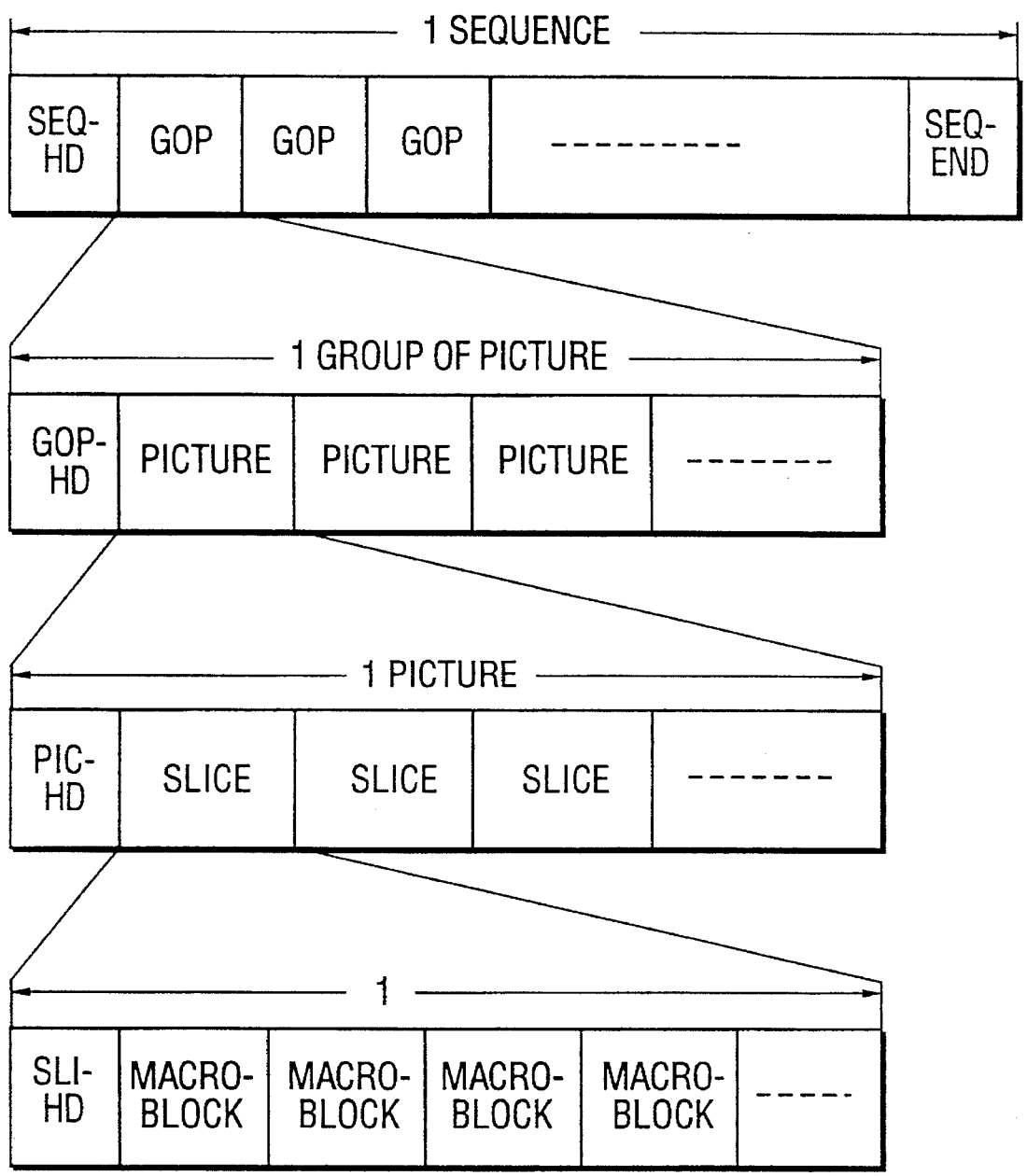
FIG. 2 is an explanatory diagram of rules of code sequences of blocks according to the MPEG standards.

The outlines of a video signal in accordance with the MPEG Standards will be explained below by referring to FIG. 2. In FIG. 2, macroblocks each includes a plurality of blocks of 8×8 pixels as a basic coding unit and luminance 16×16 pixels and color difference information corresponding thereto. The inside data thereof include respective data of these plural blocks and motion vectors commonly held in processing within macroblocks, most of these data being variable-length coded data.

A plurality of macroblocks form a slice and a plurality of slices form a picture corresponding to one frame or one field. In addition, an arbitrary number of slices form a group of pictures (GOP) and an arbitrary number of groups of pictures form a video sequence. The data groups of each layer, that is, the slice, picture, group of picture and video sequence each has on its head portion a start_code showing the start of its data as a data corresponding to the head information and the reproduction or decoding information necessary for reproduction or decoding in common to that layer, and other information. The picture header has a picture_coding_type, temporal_reference and the like. In addition, each header may have an extension data which is structured so as to have an extension_start_code, an extension_start_code_identifier expressed by four bits and the data in this order. Also, for the star_code of each header and the extension data, a consecutive code of an 8-bit pattern as shown in FIG. 3 to a bit pattern of "000001" by the hexadecimal numeration system is provided. Namely, a pattern of 23 consecutive "0" bits is provided as a reserved word pattern so as not to be appeared in other data and the reproduction side, the synchronization of reproduction can be effected by detecting the start_code.

With the input signal formed as above, the operation of the signal processing apparatus for performing scramble process shown in FIG. 1 will be described below. In this case, suppose that a scramble key is held in common between the scramble and descramble processes. As the method of holding the scramble key in common, it can be multiplexed with a scrambled signal to be transmitted, or transmitted by using any other known method, for example, by providing a separate transmission route. The signal processing apparatus for performing the scramble process comprises a code detector 1 comprising a look-up table (LUT) 3, a controller 4 and a shifter 5, and a bit inverter 2 compressing a random number generator 6 and an exclusive OR circuit 7. The video data is inputted 32 bits at a time in response to a request signal from the controller 4. In case that the video data is serial, it can be inputted, for example, by providing a buffer or the like. In the code detector 1, the shifter 5 stores 64-bit data and outputs a 32-bit data from a position indicated by a pointer signal. The pointer signal is outputted from the controller 4 and shows the bit position being processed at present. Also, when a request signal from the controller 4 is received, the oldest 32-bit data out of the 64-bit data being stored are removed and new 32-bit data are fetched. The LUT 3 is a memory storing a code book of variable-length codes existing in the video signals of the MPEG standards, and outputs to the controller 4 a bit length and a decoding result of a code at the head of the input bit pattern. The controller 4 controls as shown below to detect each code and a scramble position. The controller 4 outputs the bit position being referred at present as the pointer signal as well as sends to the LUT 3 a code book selection signal applied for the data to be referred in accordance with the rule of the MPEG standards. As a result, the code length and the decoded result of the code being referred at present are sent out from the LUT 3. The controller 4 increases the present value of the pointer signal by the code length and sends a new code book selection signal to be applied to the next code to the LUT 3 in accordance with the decoded result and the MPEG rule. In this case, if the next signal becomes a fixed-length code, the code book selection signal to the LUT 3 is made a signal showing the fixed-length code, and the signal of the shifter 5 is outputted directly to the LUT 3 instead of the decoding result. In the controller 4, only the fixed-length bit length is added to the pointer signal. In addition, when the pointer signal has bits larger than 32 bits, the controller 4 sends the request signal to the shifter 5 and the input side thereof to have 32 bits inputted newly from the input signal thereby to read it into the shifter 5 as well as to subtract 32 bits from the pointer signal. By processing as above, the controller 4 receives the decoded result of the video data from the LUT 3 thereby to make possible the detection of positions in the video data and code lengths of the codes from the head portion to a macroblock_type of macroblock. The controller 4 detects each of the codes from the head to the macroblock_type of macroblock in accordance with the detection result and outputs a scramble position signal and a random number generating signal to the random number generator.

Figure 4:
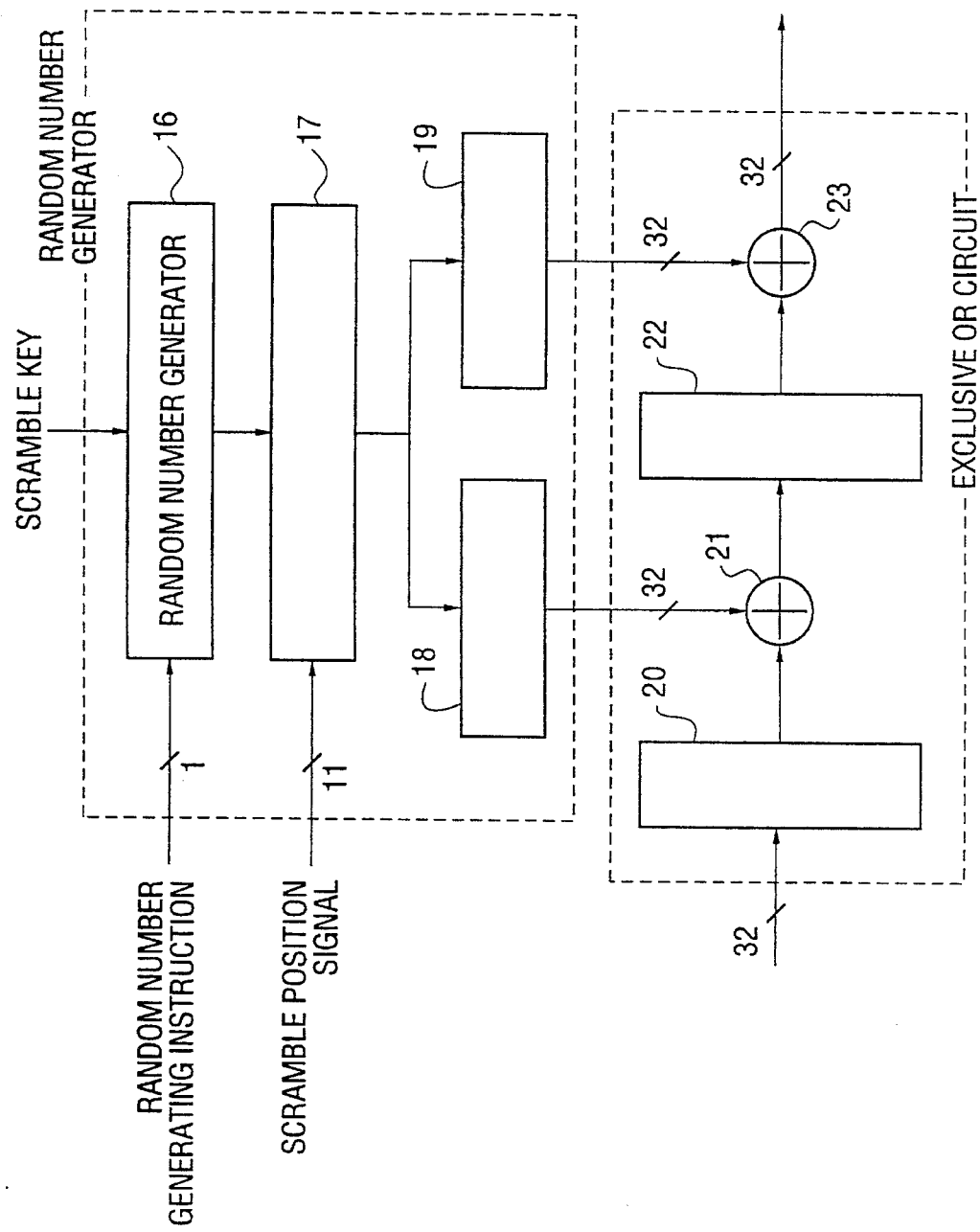
FIG. 4 is a block diagram of a bit inverter according to the first embodiment of this invention.

Next, the operation of the bit inverter 2 will be explained below. FIG. 4 is a detailed block diagram of the bit inverter. In FIG. 4, 32-bit buffers 18, 19, 20 and 22 perform reading operation in synchronization with the input video data. In this case, the buffers 18 and 19 are set all their bits to zero at a timing that 32 bits of the video data are newly inputted. Next, the random number generating signal of one bit and the scramble position signal are sent from the controller 4 to the random number generator 16 and an address processor 17, respectively. The random number generator 16 outputs a random number sequence one bit by one bit at a time when a random number generation instruction is inputted from the initial state set by the scramble key. The address processor 17, which is composed of logic gates in combination, writes the output value of the random number generator 16 into the bit positions of the buffers 18 and 19, which are expressed by the scramble position signal consisting of a 6-bit signal showing the position of the code to be applied with scramble process and a 5-bit signal showing the code length thereof. For example, if the code has the position signal of 3 and the code length of 2 bits, the output value of the random number generator is written into the third and fourth bits of the buffer 19, and if it has the position signal of 33 and the code length of 3 bits, the output value of the random number generator is written into the second, third and fourth bits of the buffer 18.

As a result, in the exclusive OR circuits 21 and 32, the output of the random number generator 16 is added code by code respectively to the bits corresponding to the codes from the head to the macroblock_type of the macroblock, thus obtaining a scrambled signal.

The explanations will be made below on the fact that by processing as above, such a pattern that has 23 consecutive "0" bits, which is a bit pattern reserved as the start_code, is not appeared in the scrambled signal to be generated. According to the rules of the MPEG standards, except for the case of the reserved word, zero is not appeared consecutively to 23 bits. As a result, the fact that zero is not appeared consecutively to 23 bits by combining the scrambled code with the code pattern before and after the same is shown below. FIG. 5 shows respective bit patterns of codes when zero is generally appeared consecutively in the code sequence in case that zero appears consecutively to plural codes to form a pattern of consecutive "0" bits, the top code that such pattern appears may be that all bits are set to "0", or a pattern having its first several bits set to "1" appears. The remainder has consecutive "0" bits, and the last code where such pattern is finished may be that the top bit is one, or zero appears consecutively to the first several bits and then, one ("1") appears. The code existing therebetween is necessary to be a bit pattern with all bits set to "0". As a result, when detecting whether or not there exists the case that 23 bits all are set to "0", for the top code of the pattern, detection is made on the number of bits "0" appearing consecutively up to the last bit of the code. For any code following thereto, detection is made in such a way that counts the number of bits "0" consecutively appeared before the code to be detected and the number of bits "0" possibly appearing consecutively from the top of the present code thereby to check whether or not zero would appear consecutively to 23 bit's. If zero does not appear consecutively up to 23 bits, the code whose all bits are set to "0" is supposed to appear, the detection may be made for the next code on what number of bits "0" appear consecutively as already explained above. The explanations will be made below based on the thought as above.

The input signal is supposed to be in accordance with the video data of the ISO/IEC KS 11172 (MPEG 1) standards. In this case, the code appeared before the macroblock may be the last code of the just preceding macroblock to the present macroblock or a q_scale code or an extension code of the slice layer in the case of the top macroblock of the slice. The last code of the macroblock is either end_of_macroblock or end_of_block, and zero appears only to one bit. Next, in the case of the top macroblock of the slice, if the extension code does not exist, the q_scale code has only four consecutive bits "0" and even including one bit showing no existence of the extension code, it has only five consecutive bits "0". Accordingly, in the case of the slice, if the extension code does not exist, the number of consecutive bits "0" appeared before the head of macroblock is only five. Next, the number of bits "0" possibly consecutively appearing in the scrambled signal will be shown below. FIG. 6 shows rules of code sequences within macroblock of the MPEG 1 standards. In FIG. 6, the conditional sentences expressed by the word "while" represent that only in the case when the conditions shown within parentheses next thereto are satisfied, the codes shown thereunder exist and that only in the time period while these conditions are being satisfied, such codes appear consecutively. On the other hand, the conditional sentences expressed by the word "if" represent that only in the case when the conditions shown within the paretheses next thereto are satisfied, the codes shown thereunder exist. In addition, if the codes thus existing are plural in number, they are enclosed in braces { }. Also, on respective right sides of the codes are shown their bit lengths. For example, the macroblock_type has a variable-length code expressed in terms of one to six bits. FIG. 7 shows the code book of a macroblock_address_increment code. In FIG. 7, bit patterns of the code are shown in the macroblock_address_increment VLC code column, and the macroblock_stuffing and macroblock_escape codes are for special cases of the macroblock_address_increment code, and if these signals appear, the macroblock_address_increment code appears next thereto as shown in the rules of FIG. 5. Considering the pattern having bit "0" consecutively appeared from the head of macroblock, if the macroblock_stuffing and macroblock_escape codes exist, such codes include both bits "0" and "1", so that zero does not appear consecutively independent of the application of bit inversion. As a result, if such two codes appear, zero does not appear consecutively to 23 bits. Accordingly, in order that bit "0" appears consecutively, it is necessary that the macroblock_stuffing and macroblock_escape codes don't exist and the bit pattern of the macroblock_address_increment code following thereto becomes such that bits "1" within the code book are bit-inverted into bits "1" by applying the scramble process thereto. FIG. 8 shows the code book of the macroblock_type code. In FIG. 8, the bit patterns of the code are shown in the VLC code column, and in the columns on the right side thereof are shown flag information on the codes which may appear in the subsequent macroblocks. In the case that bit 1 is shown in each column, it is shown that the code corresponding to its flag exists to appear at a position shown by the subsequent conditional sentence. In addition, the code book uses different one depending on how to code the picture in which the macroblock is contained. These code books are identified by the picture_coding_type code existing on the picture layer and I-picture, P-picture, B-picture and D-picture being known. Of which, the D-picture does not exist on the same video sequence. As a result, the scramble process of this embodiment is supposed to be carried out on the video sequence having existed the I-picture, P-picture and B-picture.

In the case that the macroblock is contained into the I-picture, bit "0" appears consecutively only when the code of bit pattern "1" in the code book is bit-inverted into bit pattern "0" by the scramble process. In this case, the flag of the macroblock_type is such that the macroblock_intra only becomes one and as a result, the subsequent code becomes a code coming to the head of the block layer. FIG. 9 shows rules of code sequences on the block layer, in which if the macroblock_intra is one, a dic_dc_size luminance code is appeared. FIG. 10 shows the code book of the dct_dc_size luminance code. The number of consecutive bits "0" appearing up to this point when counted since before the macroblock is added with two bits generated through the scramble process thereby to obtain 7 bits at the largest, which means that all bits are necessary to be set to "0". Such condition can be satisfied only in the case that the bit pattern showing that the bit length of a dct_dc_differential code is one is "00". As a result, the bit length of the dct_dc_differential code appeared next thereto becomes one, and the number of bits "0" consecutively appeared to this code is 10 at the largest. However, in the case of a dct_coeff_next code consecutive next thereto, such a code that all bits are set to "0" does not exist, and there exists only the code in which zero appears consecutively to 11 bits at the largest even when counted from the top thereof. FIGS. 11(a), (b) and (c) show the cases that bit "0" appeared consecutively at the longest by satisfying the above-described condition in the I-, P- and B-pictures, respectively. Of which, FIG. 11(a) shows a bit pattern satisfying the above-described condition in the I-picture. When the macroblock is contained in the I-picture as shown in FIG. 11(a), zero appears consecutively only up to 21 bits, being not coincided with the reserved word.

In the case that the P-picture has macroblocks, only when the code of the bit pattern "1" in the code book is bit-inverted into a bit pattern "0" by the scramble process, bit "0" appears consecutively. In this case, the flag of macroblocks has a macroblock_motion_foward code and macroblock_pattern each becoming one, so that the code appeared successively thereto is a motion_horizontal_foward code. FIG. 12 shows the code book of a motion vector becoming the code book of the motion_horizontal_foward code. As the bit pattern of the code, there does not exist such a pattern that all bits are zero, and even the number of bits "0" appeared consecutive from the top thereof becomes six at the largest. FIG. 11(b) is a bit pattern satisfying the above-mentioned condition, in which when the macroblock is contained in the P-picture, the length of bits "0" appeared consecutively by the P-picture scramble process becomes 13 bits at the longest, being not coincided with the reserved word.

Also, in the case that the B-picture has macroblocks, only when the bit pattern "11" of the code is bit-inverted into a bit pattern "00" by the scramble process, bit "0" appears consecutively in accordance with the code book shown in FIG. 8. Thereafter, the motion_horizontal_foward code appears according to the flag information of macroblock and as a result, bit "0" appears consecutively to six bits at the longest as in the case of P-picture. FIG. 11(c) is a bit pattern satisfying the above-mentioned condition, in which When the macroblock is contained in the B-picture, the length of bits "0" appeared consecutively by the scramble process becomes 14 bits at the longest, being not coincided with the reserved word.

As a result, the scramble process according to this embodiment results in no generation of bit pattern coincided with the reserved word.

Referring to FIG. 1 again, the descramble apparatus shown in FIG. 1 comprises a code detector 8 comprising a look-up table (LUT)10, a controller 11, a shifter 12, which are the same in structure as with the code detector 1, and an exclusive OR circuit 13 disposed between the LUT 10 and the shifter 12, and a bit inverter 9 comprising a random number generator 14 and an exclusive OR circuit 15. As the scramble key, the same key as scrambled is provided to the random number generator 14. The random number generator 14 generates the same random number sequence as that with the random number generator 6. The code detector 8 detects each code of the scrambled signal generated through the scramble processing apparatus as in the case of the code detector 1. In this case, the controller 11 transmits the same signal to the random number generator 14 as that which the controller 4 sends to the random number generator 6, and only the random number generating signal is sent out at the timing of one code before. Namely, the controller 11 outputs the random number generating signal to the random number generator 14 when the next code to be outputted is from the head code of macroblock. The random number generator 14 generates a random number value having added to the head code of macroblock through the scramble apparatus and outputs its random number output to the exclusive OR circuit 13. As a result, in the case that the LUT 10 detects the head code of macroblock, the input thereof becomes a value obtained by exclusively logically adding the scrambled signal to the output of the random number generator 14 thereby to become a signal having the scramble released, thus being detected properly. The controller 11 detects the code length properly even for the scrambled code and outputs the detection result to the random number generator 14. The random number generator 14 outputs the same random number value as that with the random number generator 6. However, the random number generating instruction is sent out at a timing earlier by one code. A circuit for storing the random number value for one code is provided, and the value thus stored is used as an output to the exclusive OR circuit 15. On the other hand, the value generated immediately in response to the random number generating instruction is outputted to the exclusive OR circuit 13. By processing as described above, the scrambled code can be properly detected by applying the logical summing operation before the random number value used for bit inversion is code-detected and as a result, from this detection result, the scrambled signal is subjected to the bit inversion through the bit inverter 9 thereby to obtain the original data.

As explained above, according to the first embodiment, only several codes from the head of macroblock are scrambled, so that as the random number, only several bits are necessary for each macroblock and the entire picture can be made unreproducible by using a low-speed random number generator.

In addition, since the code to be scrambled is of a variable length, once the bit inversion is applied, the subsequent data can be made defective in reproduction until the next slice__start code is received. As a result, the ON/OFF operation of scramble can be controlled for every slice, and within the slice, the position where becomes unreproducible can be controlled for every macroblock.

In addition, in the first embodiment, all codes from the head to the macroblock_type of a macroblock were to be scrambled. However, if the previous codes are to be scrambled, there is no bit pattern coincided with the reserved word, resulting in obtaining the same effects. Further in addition, in the first embodiment, it was made that the extension code of slice did not exist. However, if as the extension code, any special code with all bits set to "0" is to be inserted in the future, the length of bits "0" appearing consecutively up to the macroblock becomes nine bits at the longest. In such case, the codes up to the macroblock address may be scrambled. Also, in the first embodiment, the input signal was made of a video signal of the ISO/IEC 11172 standards, but not limited thereto. On a video signal of the ISO/IEC 13818 standards, the same explanations can be provided. Namely, in the case of the video signal of the ISO/IEC 13818 standards, the number of bits "0" appearing consecutively before the macroblock becomes nine bits at the largest if an extra_bit_slice is used as the code and as a result, if the bit inversion is carried out up to the macroblock_type, zero may appear consecutively to 23 bits, so that the codes up to the macroblock_address_increment may be to be bit-inverted. In this case, the code having the macroblock_type with all bits set to "0" does not exist, and the number of bits "0" appearing consecutively from the top of the code is five at the largest. As a result, in the case of the ISO/IEC 13818 standards, by detecting the codes up to the macroblock_address_increment as the scrambled signal by the code detectors 1 and 8, the scrambled signal not coincided with the reserved word can be obtained. In the case of D-picture, if the codes up to the macroblock_address is to be scrambled, no coincidence with the reserved word results. In addition, in the first embodiment, the scramble process is carried out macroblock-by-macroblock, but not limited thereto. Only the scramble process may be carried out only for the top macroblock of slice. Particularly, in this case, there does not need to read out the code within macroblock when detecting the code to be scrambled, leading to the scale reduction of apparatus.

Figure 13:
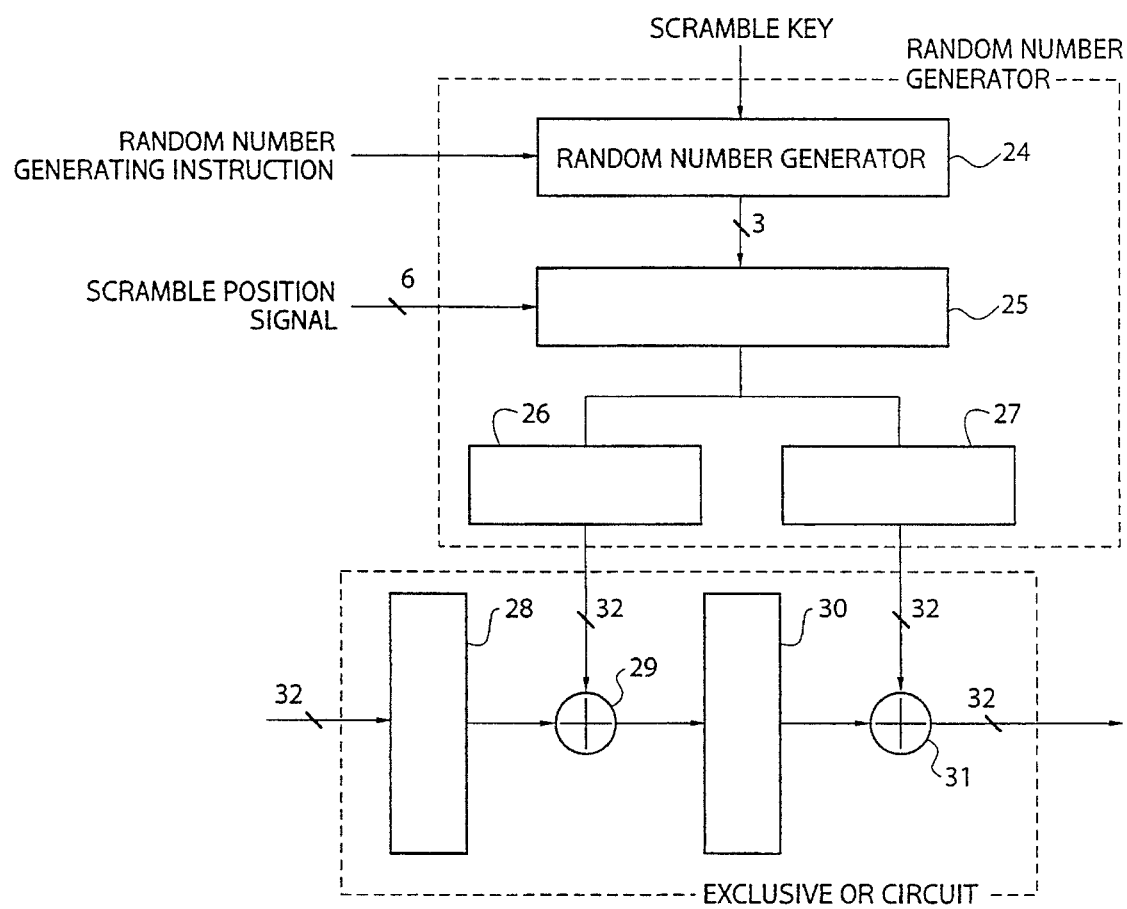
FIG. 13 is a code book of a motion vector.

Next, explanations will be made below on a scramble apparatus, a signal processing apparatus for performing scramble process and a signal processing apparatus for performing descramble process according to a second embodiment of this invention. The apparatus according to the second embodiment is the same in functional structure as the apparatus in the first embodiment. As a result, the explanations will be made while each functional block of FIG. 1 is corresponding to that of the second embodiment. The code detector 1 detects each bit in a video signal as in the first embodiment, and the controller 4 transmits a top position signal of six bits of macroblock and a random number generating signal of one bit to the random number generator 6 of the bit inverter 2 in accordance with the detection result thus obtained. FIG. 13 is a block diagram of the bit inverter, in which a random number generator 24 outputs a random number sequence three bits by three bits at a time when the random number generating signal is inputted. In the address processor 25, the output of the random number generator 24 is inputted to buffers 26 and 27 respectively at positions of three bits apart from the bit position indicated by the scramble position signal. The buffers 26, 27, 28 and 30 and exclusive OR circuits 29 and 31 are the same in process as the buffers 18, 19, 20 and 22 and exclusive OR circuits 21 and 23 as shown in FIG. 4. As a result, such a scrambled signal can be obtained that the random number is logical-exclusively added to three bits from the head of macroblock. In the descramble apparatus, the code detector 8 detects each code in the scrambled signal similar to the first embodiment. The controller 11 transmits the scramble position signal and the random number generating signal to the random number generator 14 at a timing of being the head of macroblock in accordance with the detection result. In this case, however, the random number generating signal is transmitted at a timing earlier by one code than the scramble position signal, that is, transmitted just before the head of macroblock. The random number generator 14 generates a random number of three bits and outputs it to the exclusive OR circuit 13. The exclusive OR circuit 13 applies the logical exclusive OR operation to the top three bits of the output of the shifter 12 and outputs the result to the LUT 10. As a result, to the LUT 10 is transmitted the signal having scramble released even if the code is of the head of macroblock, thus performing the code detection properly. The controller 11 sends the scramble position signal in accordance with the code detection result to the random number generator 14 as with the controller 4 and in addition, outputs the code bit length signal thus detected to the random number generator 14 until the total code length counted from the head of macroblock exceeds three bits. The random number generator 14 shifts the random number value of three bits for the code length of the code bit length signal to output to the exclusive OR circuit 13. Namely, if the head code of macroblock is one bit, in the case that the next code is detected, two bits of the 3-bit random number is logical-exclusively added to the top two bits of the output of the shifter 12. As a result, to the LUT 10 is transmitted the signal having scramble released by the exclusive OR circuit 13 until the detection of the code containing any of the top three bits of macroblock is finished, thus resulting proper code detection. The bit inverter 9 performs logical exclusive addition of the random number value to the top three bits of macroblock in accordance with the scramble position signal thereby to obtain the original data.

Next, explanation will be made below on the fact that the scrambled signal generated is not coincided with the reserved word. The input signal is supposed to be a video signal in accordance with the ISO/IEC IS 11172 standards. First, the length of bits "0" already appeared consecutively at the head of macroblock is five bits at the longest as shown above. Next, the number of bits "0" appeared consecutively when three bits applied with scrambling process were all made zero will be shown below. In the case that the code of the head of macroblock has the bit length exceeding three bits, only that head code will be scrambled. Such case becomes equivalent to the case that the top three bits of the codes having the bit length exceeding three bits in the codes shown in FIG. 6 were made zero. However, as clear from FIG. 7, such a condition that bit "0" appears consecutively to 23 bits or that the entire code is made of consecutive bits "0" is satisfied when the code having the bit pattern of "0010" is converted through scramble process into the code with the bit pattern of "0000". Even in this case, however, the macroblock_type code following thereto, according to the code book shown in FIG. 8, bit "0" is consecutive only to five bits, being not consecutive to 23 bits. In the case that the head code of macroblock is less than three bits, namely, in the case that the bit pattern of the macroblock_address_increment code is one and made zero after scrambled from FIG. 7, the remaining two bits are added into the code following thereto. However, the macroblock_type code next thereto has six bits at the largest as shown in FIG. 8 and as a result, even if the top two bits were made zero by scramble process, excepting that the remaining bits all are made zero, bit "0" does not appear consecutively to 23 bits. Next, explanations will be made below on the case that all bits are made zero for every picture in which macroblocks exist.

When macroblocks are contained in the I-picture, the case that "1" and "01" are converted respectively into "0" and "00" will be considered. First, when "0" was converted into "1" the top one bit of the dct_dc_size luminance code which is a code appearing next is scrambled. In this case, bit "0" appears consecutively only when "100" is converted into "000" and "00" is converted into "00". However, respective sizes of the dct_dc_differential codes that they indicate are zero and one, so that in both cases, bit "0" appears consecutively to three bits after the macroblock_type. Further in addition, in the dct_coeff_next code subsequently appears as shown above, there does not exist any code whose bits are all zero, and bit "0" appears consecutively to 11 bits at the largest as well as to 14 bits after the macroblock_type. Consequently, in this case, bit "0" appears consecutively to 21 bits at the largest, being not coincided with the reserved word. When "01" was converted into "00", a 5-bit fixed length code of the quantizer-scale appears thereafter. However, the code with five bits all set to "0" is prohibited, so that bit "0" appears consecutively to four bits at the largest, resulting in no coincidence with the reserved word. As a result, in the case that macroblocks are in the I-picture, the scrambled signal does not coincide with the reserved word.

Next, the case when macroblocks are contained in the P-picture will be considered. Here, the case that "1" and "01" are converted respectively into "0" and "00" will be described First, when "1" was converted into "0" the top one bit of the motion_horizontal_forward code next thereto is scrambled. The motion_horizontal_forward code has 11 bits at the largest and as a result, even if the top one bit is converted into zero, excepting that the pattern whose remaining bits are all made zero, bit "0" appears consecutively to 23 bits. The case of satisfying such condition can be obtained only when "1" was converted into "0" according to the code book shown in FIG. 12. In this case, however, what follows thereto is a motion_vertical_forward code generated in the some code book, in which the length of bits "0" consecutive from the top thereof is six bits at the largest, so that bit appears consecutively to 14 bits at the largest, being not coincided with the reserved word. Next, when "01" was converted into "00", a coded_block_pattern appears next thereto. FIG. 14 is the code book of the coded_block_pattern, in which the length of bits "0" consecutive from the top is seven bits at the longest, being 15 bits even in total, thus being not coincided with the reserved word. As a result, in the case that macroblocks are contained in the P-picture, the scrambled signal does not coincide with the reserved word.

Next, when macroblocks are contained in the B-picture, the case that "10", "11" and "010" are converted respectively into "00", "00" and "000" will be considered. First, when "10" and "11" were converted respectively into "00" and "00" the motion_horizontal_forward code which follows thereto has the length of bits "0" consecutively appearing is six bits at the longest and 14 bits even in total from FIG. 12, being not coincided with the reserved word. In addition, when "010" was converted into "000", a motion_horizontal_backward code which follows thereto has the length of bits "0" consecutively appearing is six bits at the longest and 15 bits even in total, being not coincided with the reserved word. As a result, in the case when macroblocks are contained in the B-picture, the scrambled signal does not coincide with the reserved word. Consequently, the scramble process according to this embodiment results in no coincidence of the scrambled signal with the reserved word.

As described above, according to the second embodiment, by limiting the length of bits to be scrambled from the head of macroblock, the scrambled signal not coincided with the reserved word can be generated. Furthermore, since the scrambled code is of variable-length, the code thereafter becomes impossible to be read out, and such a scramble apparatus that makes it impossible to be read out on a whole basis can be realized by using a low-speed scrambling process.

In addition, in the second embodiment, it was made that three bits from the head of macroblock were processed, but not limited thereto. The bit to be scrambled may be made variable in the range of being not coincided with the reserved word picture-by-picture. Also, the macroblock was made as the start position, but not limited thereto. The scramble apparatus can be formed in the same thinking way as shown above even if the head of slice is made as the start position. Further in addition, in the second embodiment, the input signal was made of a video signal of the ISO/IEC 11172 standards, but not limited thereto. If the top one bit of macroblock is to be scrambled, the scrambled signal is not coincided with the reserved word. As a result, in this case, the random numbers generated through the random number generators 2 and 4 may be made one bit for each detected signal and add to top one bit of macroblock.

Figure 15A:
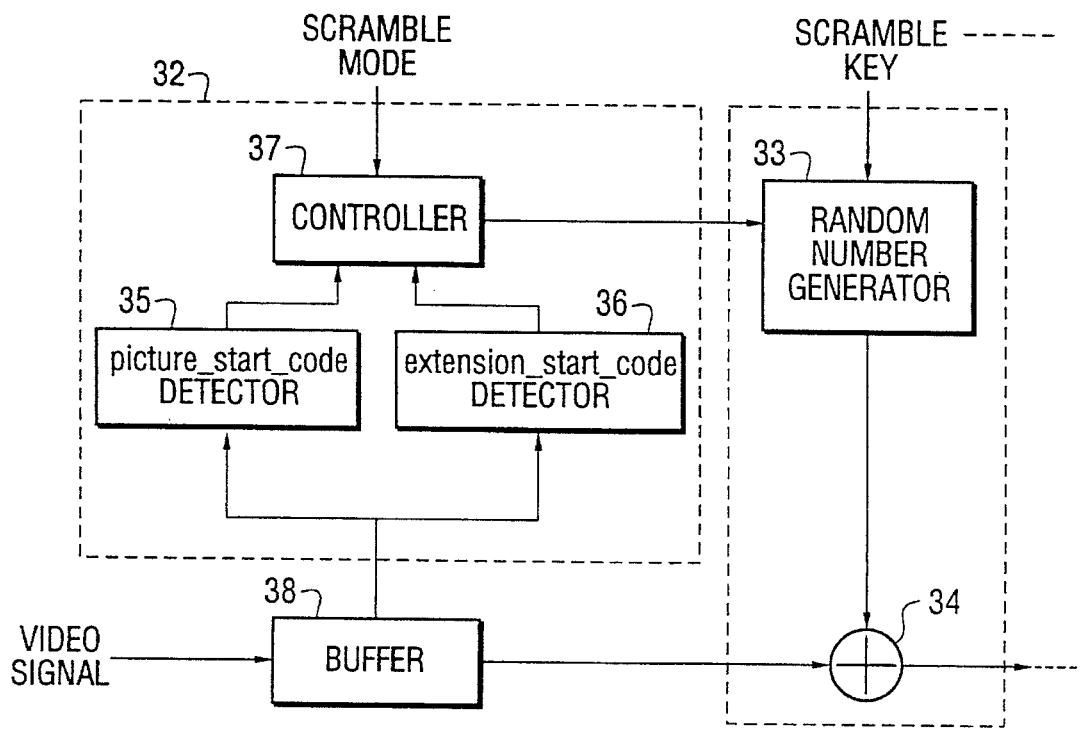
FIG. 15 is a block diagram of a scramble processing apparatus and a descramble processing apparatus according to a third embodiment of this invention.
Figure 15B:
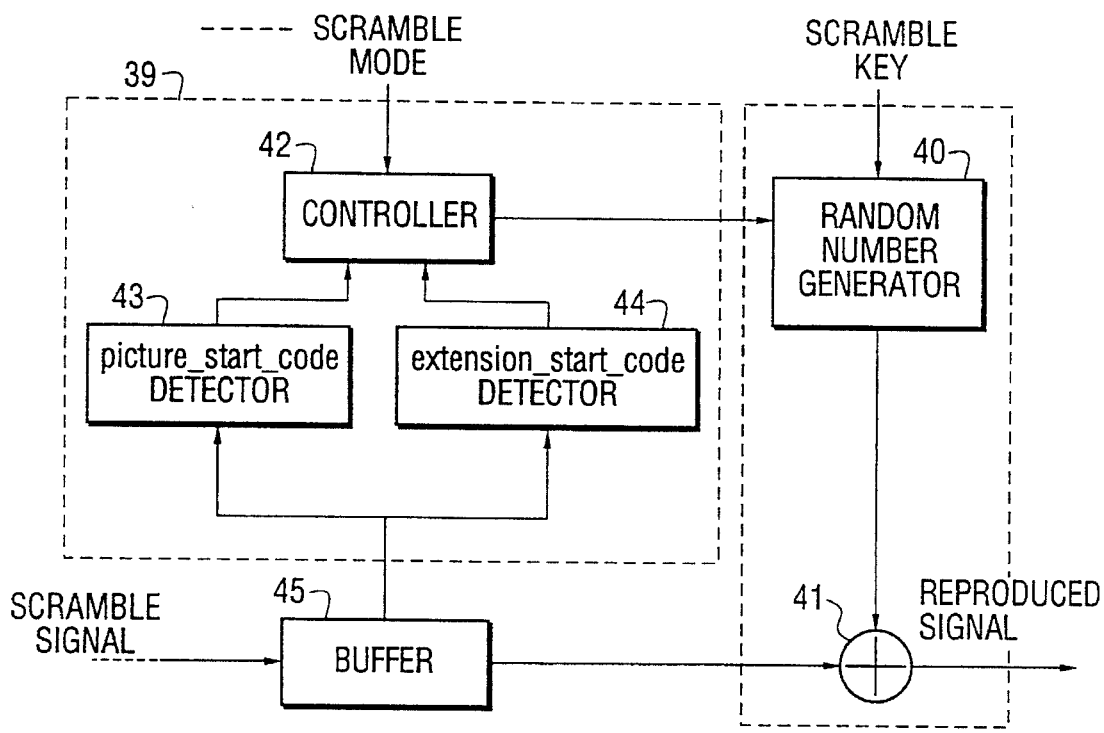

FIG. 15 is a block diagram of a scramble apparatus and a descramble apparatus using a signal processing apparatus according to a third embodiment of this invention, in which the scramble key and the scramble mode are employed in common to both the scramble and descramble processes. As the method of employing in common, such a method that is multiplexed with the scrambled signal to be transmitted or that is additionally provided with completely separate route may be employed, or known methods may be employed. The video signal is a bit serial signal. A buffer 38 stores temporarily the input signal and outputs it after delayed for a constant period of time to an exclusive OR circuit 34 as well as outputs the bit value of 32 consecutive bits of the video signal stored temporarily to a picture_start_code detector 35 and an extension_start_code detector 36 of a code detector 32. The picture_start_code detector 35 and the extension_start_code detector 36 are structured of logical gates in combination so as to output the detected output value of "1" to a controller 37 when the input signal was coincided with respective bit patterns of the picture_start_code and the extension_start_code. The controller 37 receives the detected signals from the picture_start_code detector 35 and the extension_start_code detector 36 and a scramble mode signal thereby to carry out as follows. The scramble mode signal is a 3-bit signal, in which a first bit indicates whether or not the scramble process is applied for the temporal_reference, a second bit indicates whether or not the scramble process is applied for the picture_coding_type and a third bit indicates whether or not the scramble process is applied for the extension_start_code_identifier, which indicate that when these bits are respectively "1" the corresponding processes are carried out.

When the controller 37 receives the picture_start_code detected signal and the first bit of the scramble mode signal is "1" the controller 37 transmits the random number generating signal at the timing that the 10-bit signal just thereafter passes through the exclusive OR circuit 34. Also, when the controller 37 receives the picture_start_code detected signal and the second bit of the scramble mode signal is "1" the controller 37 transmits the random number generating signal at the timing that the twelfth and thirteenth bits from the picture_start_code pass through the exclusive OR circuit 34 as well as transmits a signal making the output of the random number generator of the bit pattern "0" forcibly at the timing that the eleventh bit therefrom passes therethrough. Next, when the controller 37 receives the extension_start_code detected signal and the third bit of the scramble mode signal is "1" the controller 37 transmits the random number generating signal at the timing that four bits immediately after the extension_start_code pass through the exclusive OR circuit 34. The random number generator 33 outputs one bit to the exclusive OR circuit 34 according to the random number generation rule based on the scramble key at the timing of receiving the random number generating signal. In addition, only when receiving a signal for outputting the bit pattern "1" forcibly, the random number generator outputs the bit pattern "1" and in the other cases than this, it always outputs the bit pattern "0". As a result, the exclusive OR circuit 34 applies the exclusive OR process only to the random number to be scrambled to obtain the scrambled signal. On the descramble side, it has the same structure as the scramble apparatus and carries out the same processes as with the scramble apparatus thereby to obtain a descramble signal.

As explained above, according to the third embodiment, additionally to the temporal_reference, the converting process is applied even to the picture_coding_type showing the coded states of pictures. As a result, if any picture is intended to reproduce without applying the descramble process, the interpretation may be made that such picture is being applied with a different coding from the original one, so that the reading method and the like of data within the picture will be mistaken. Accordingly, the reproduction can be made impossible for those not having the descramble processing circuit. In addition, the code detector detects the picture_start_code and the extension_start_code, and if being capable of reading several codes subsequent thereto, the codes thus read out also are of a fixed length, so that other variable-length codes are unnecessary to be detected, thus being realizable a simple apparatus. Further in addition, the scramble mode signal is provided thereby to indicate whether or not respective modes are to be processed and as a result, these modes can be processed individually or in combination.

Also, in the third embodiment, as the data to be transmitted, such data as specified by the ISO/IEC IS 11172 and ISO/IEC CD 13818 standards were provided, but not limited thereto. It is needless to say that for other signals than those, the scramble transmission apparatus can be structured by the same procedures as described above.

What is claimed is:

1. A transmitting apparatus comprising a scramble processing apparatus and a descramble processing apparatus, wherein transmission data have a certain specific bit pattern therewithin as a reserved word reserved as a code having a particularly specified meaning and data rules specified so as not to generate the certain specific bit pattern except for the particularly specified meaning, said scramble processing apparatus comprising a code detector for detecting a code existing at a prespecified position within the transmission data, and a bit inverter for bit-inverting the detected code, and said descramble processing apparatus comprising a code detector for detecting a code existing at the prespecified position, and a bit inverter for bit-inverting the detected code, the code existing at said prespecified position being a code which does not generate a bit pattern coincided with the reserved word even if any bit inversion is applied thereto.

2. A signal processing apparatus for processing data having a certain specific bit pattern therewithin as a reserved word reserved as a code having a particularly specified meaning and data rules specified so as not to generate the certain specific bit pattern except for said particularly specified meaning, said signal processing apparatus comprising a code detector for detecting a code existing at a prespecified position within the data, and a bit inverter for bit-inverting the detected code, the code existing at said prespecified position being a code which does not generate a bit pattern coincided with the reserved word even if any bit-inversion is applied thereto.

3. The signal processing apparatus according to claim 2, wherein said bit inverter controls its bit inverting operation in response to a scramble key.

4. The signal processing apparatus according to claim 3, wherein said code detector detects a scrambled code and said bit inverter descrambles the detected scrambled code.

5. The signal processing apparatus according to claim 2, wherein said code detector detects at least one code existing from the prespecified position of digital video data in accordance with the MPEG standards.

6. The signal processing apparatus according to claim 5, wherein said code detector detects each of codes from a top code to a macroblock-type code of a macroblock within the data.

7. The signal processing apparatus according to claim 5, wherein said code detector detects each of codes from a top code to a macroblock address increment code of a macroblock within the data.

8. A scrambling method for scrambling data having a certain specific bit pattern within the data as a reserved word reserved as a code having a particularly specified meaning and data rules specified so as not to generate the certain specific bit pattern except for said particularly specified meaning, said scrambling method comprising the steps of detecting a code which exists at a prespecified position and does not generate a bit pattern coincided with the reserved word within the data even if a bit-inversion is applied, and bit-inverting the detected code.

9. The scrambling method according to claim 8, wherein said detected code is at least one code existing from the prespecified position of digital video data in accordance with the MPEG standards.

10. The scrambling method according to claim 9, wherein said detected code is a code obtained by detecting each of codes from a top code to a macroblock-type code of a macroblock of video data in accordance with the MPEG standards.

11. A descrambling method wherein data have a certain specific bit pattern therewithin as a reserved word reserved as a code having a particularly specified meaning and data rules specified so as not to generate the certain specific bit pattern except for the particularly specified meaning and a scrambled signal obtained by bit-inverting a code existing at the prespecified position and not generating a bit pattern coincided with the reserved word even if a bit-inversion is applied is descrambled, said descrambling method comprising the steps of detecting a bit-inverted code within the scrambled signal, and bit-inverting the detected code.

12. The descrambling method according to claim 11, wherein the code to be detected is at least one code existing from the prespecified position of digital video data in accordance with the MPEG standards.

13. The descrambling method according to claim 12, wherein the code to be detected is a code obtained by detecting each of codes from a top code to a macroblock-type code of a macroblock of video data in accordance with the MPEG standards.

14. A transmitting apparatus comprising a scramble processing apparatus and a descramble processing apparatus, wherein transmission data have a certain specific bit pattern therewithin as a reserved word reserved as a code having a particularly specified meaning and data rules specified so as not to generate the certain specific bit pattern except for the particularly specified meaning, said scramble processing apparatus comprising a code detector for detecting a prespecified position within the transmission data, and a scrambler for scrambling a data existing within plural bits from the prespecified position and not coincided with the reserved word when scrambled, and said descramble processing apparatus comprising a code detector for detecting the prespecified position, and a descrambler for descrambling a scrambled data existing from the detected position.

15. A signal processing apparatus for processing data having a certain specific bit pattern as a reserved word reserved as a code having a particularly specified meaning and data rules specified so as not to generate the certain specific bit pattern except for the particularly specified meaning, said signal processing apparatus comprising a code detector for detecting a prespecified position within the data, and a scrambler for scrambling a data existing within predetermined plural bits from the detected position and not coincided with the reserved word when scrambled.

16. The signal processing apparatus according to claim 15, wherein said scrambler scrambles the data to be scrambled by applying a conversion process specified in accordance with a scramble key.

17. The signal processing apparatus according to claim 15, wherein said scrambler is descramble processing means for descrambling a scrambled code.

18. The signal processing apparatus according to claim 15, wherein said code detector detects a prespecified position of digital video data in accordance with the MPEG standards, and said scrambler scrambles the data existing within plural bits from the detected position and having no possibility to be coincided with the reserved word when scrambled.

19. The signal processing apparatus according to claim 18, wherein said scrambler scrambles any data within three bits from a top of a macroblock within the data.

20. The signal processing apparatus according to claim 18, wherein said scrambler scrambles a top bit of a macroblock of data.

21. The signal processing apparatus according to claim 18, wherein said scrambler is a scrambling circuit for scrambling a code by applying a converting process specified in accordance with a scramble key.

22. The signal processing apparatus according to claim 18, wherein said scrambler is descrambling means for descrambling a scrambled code.

23. A transmitting apparatus comprising a scramble processing apparatus and a descramble processing apparatus, said scramble processing apparatus having a scrambler for scrambling a prespecified code, said descramble processing apparatus having a descrambler for descrambling the prespecified code, and said prespecified code being a code not to generate a bit pattern coincided with a reserved word within a transmission data even if a scrambling process is applied thereto.

24. A scramble transmission method for performing a scramble process on its transmission side and a descramble process on its reception side, wherein transmission data have a certain specific bit pattern therewithin as a reserved word reserved as a code having a particularly specified meaning and data rules specified so as not to generate the certain specific bit pattern except for the particularly specified meaning, said scramble process comprising the steps of detecting a code for detecting a specified position within the transmission data, and scrambling a data within plural bits from the detected position and not coincided with the reserved word when scrambled, and said descramble process comprising the steps of detecting the specified position, and descrambling a scrambled data at the detected position.

25. A scrambling method for scrambling data having a certain specific bit pattern therewithin as a reserved word reserved as a code having a particularly specified meaning and data rules specified so as not to generate the certain specific bit pattern except for the particularly specified meaning, said scrambling method comprising the steps of detecting a specified position within the data, and scrambling a data existing within predetermined plural bits from the detected position and not coincided with the reserved word when scrambled.

26. The scrambling method according to claim 25, wherein said detecting step detects a prespecified position of digital video data in accordance with the MPEG standards, and said scrambling step scrambles a data existing within predetermined plural bits from the detected position and having no possibility to be coincided with the reserved word when scrambled.

27. The scrambling method according to claim 26, wherein said scrambling step scrambles a data within three bits from a top of a macroblock.

28. The scrambling method according to claim 26, wherein said scrambling step scrambles a top bit of a macroblock.

29. A descrambling method wherein transmission data have a certain specific bit pattern therewithin as a reserved word reserved as a code having a particularly specified meaning and data rules specified so as not to generate the certain specific bit pattern except for the particularly specified meaning, and a scrambled signal obtained by scrambling a data within plural bits not coincided with the reserved word when scrambled from a prespecific position within the transmission data is descrambled, said descrambling method comprising the steps of detecting a position of a prespecified code within the scrambled signal, and descrambling a scrambled bit at the detected position.

30. The descrambling method according to claim 29, wherein said detecting step detects a prespecified position of digital video data in accordance with the MPEG standard, and said descrambling step descrambles a data within plural bits having no possibility to be coincided with the reserved word when scrambled.

31. The descrambling method according to claim 30, wherein said descrambling step descrambles a data within three bits from a top of a macroblock.

32. The descrambling method according to claim 30, wherein said descrambling step descrambles a top bit of a macroblock.

33. A transmitting apparatus comprising a scramble processing apparatus and a descrambling apparatus, wherein transmission data have a certain specific bit pattern as a reserved word reserved as a code having a particularly specified meaning and data rules specified so as not to generate the certain specific bit pattern except for the particularly specified meaning, said scramble processing apparatus comprising a code detector for detecting a prespecified code within the transmission data, and a converter for converting the detected code into a different bit pattern, said prespecified code being a code not generating a bit pattern coincided with the reserved word even if a converting process is applied, said descramble processing apparatus comprising a code detector for detecting the prespecified code, and a converter for descrambling a scrambled data in the detected code.

34. A signal processing apparatus for processing transmission data having a certain specific bit pattern as a reserved word reserved as a code having a particularly specified meaning and data rules specified so as not to generate the certain some specific bit pattern except for the particularly specified meaning, said signal processing apparatus comprising a code detector for detecting a prespecified code within the transmission data, and a converter for converting the detected code into a different bit pattern, and said prespecified code being a code not generating a bit pattern coincided with the reserved word even if a converting process is applied.

35. The signal processing apparatus according to claim 34, wherein said converter scrambles a code through a converting process specified in accordance with a scramble key.

36. The signal processing apparatus according to claim 34, wherein said converter is descramble processing means for descrambling a scrambled code.

37. The signal processing apparatus according to claim 34, wherein said code detector detects a picture-coding-type code of digital video data in accordance with the MPEG standards.

38. The signal processing apparatus according to claim 37, wherein said converter scrambles a code through a converting process specified in accordance with a scramble key.

39. The signal processing apparatus according to claim 37, wherein said converter is descramble processing means for descrambling a scrambled code.

40. The signal processing apparatus according to claim 34, wherein said code detector detects a temporal__reference code of video data in accordance with the MPEG standards.

41. The signal processing apparatus according to claim 40, wherein said converter scrambles a code through a converting process specified in accordance with a scramble key.

42. The signal processing apparatus according to claim 40, wherein said converter is descramble processing means for descrambling a scrambled code.

43. The signal processing apparatus according to claim 34, wherein said code detector detects an extension__start__code__identifier code of video data in accordance with the MPEG standards.

44. The signal processing apparatus according to claim 43, wherein said converter scrambles a code through a converting process specified in accordance with a scramble key.

45. The signal processing apparatus according to claim 43, wherein said converter is descramble processing means for descrambling a scrambled code.

46. A scramble transmission method for performing a scramble process on its transmission side and a descramble process on its reception side, wherein transmission data have a certain specific bit pattern as as reserved word reserved as a code having a particularly specified meaning and data rules specified so as not to generate the certain specific bit pattern except for the particularly specified meaning, said scramble process comprising the steps of detecting a prespecified code, and converting the detected code into a different bit pattern, and said descramble process comprising the steps of detecting a prespecified position within the transmission data, and descrambling a scrambled data at the detected position.

* * * * *